United States Patent [19]

Sakano

[11] Patent Number: 5,764,812
[45] Date of Patent: Jun. 9, 1998

[54] IMAGE PROCESSING APPARATUS FOR PROVIDING AN ISOLATED-DOT REMOVING FUNCTION

[75] Inventor: Yukio Sakano, Fuchu, Japan

[73] Assignee: Ricoh Company, Ltd., Tokyo, Japan

[21] Appl. No.: 747,074

[22] Filed: Nov. 8, 1996

[30] Foreign Application Priority Data

Nov. 10, 1995 [JP] Japan ................................. 7-317523
Apr. 11, 1996 [JP] Japan ................................. 8-114114

[51] Int. Cl.$^6$ ............................. G06K 9/40; H04N 1/409
[52] U.S. Cl. ....................... 382/261; 382/275; 358/462; 358/468
[58] Field of Search ............................. 382/275, 254, 382/260–269; 358/447, 448, 462, 463

[56] References Cited

U.S. PATENT DOCUMENTS

| 4,760,464 | 7/1988 | Sakano | 358/461 |
| 4,984,283 | 1/1991 | Sakano | 382/206 |
| 5,144,456 | 9/1992 | Sakano | 358/448 |
| 5,245,445 | 9/1993 | Fujisawa | 358/462 |

FOREIGN PATENT DOCUMENTS 62-104372  5/1987  Japan.
2-294878  12/1990  Japan.

*Primary Examiner*—Scott Rogers
*Attorney, Agent, or Firm*—Oblon, Spivak, McClelland, Maier & Neustadt, P.C.

[57] ABSTRACT

An image processing apparatus includes a plurality of detecting units each of which detects whether binary signals derived from picture elements of image data match with one of a plurality of patterns of isolated dots, the detecting units generating a plurality of detection signals which are set based on respective results of the detections with respect to the isolated-dot patterns, wherein the isolated-dot patterns are different from each other in the number of isolated dots included in each pattern, the isolated-dot patterns having respective sizes predetermined for isolated-dot removing function levels. A selecting unit selects one of the isolated-dot removing function levels in response to an operation control signal, the selecting unit generating an isolated-dot signal which is set for each picture element based on the detection signals by the selected isolated-dot removing function level. An operation control part inputs the operation control signal to the selecting unit in accordance with a setting by an operator with respect to one of the isolated-dot removing function levels.

11 Claims, 9 Drawing Sheets

IMAGE PROCESSING APPARATUS FOR PROVIDING AN ISOLATED-DOT REMOVING FUNCTION

BACKGROUND OF THE INVENTION

(1) Field of the Invention

The present invention generally relates to an image processing apparatus, and more particularly to an improvement in a process of correcting a background image for an increased level of image quality. The present invention is suitably applicable to a digital copying machine, a facsimile machine or an image reading device.

(2) Description of the Related Art

Generally, image processing devices such as digital copiers have come to have the capability of reproducing a high-quality image by using a special function to correct a background image so as to improve the image quality. The special function is to eliminate noises contained in an original image so as to produce a corrected processed image with a clear background.

Japanese Laid-Open Patent Application No.2-294878 teaches a special function to correct a background image for use in an image processing device. In the image processing device of the above publication, the special background correcting function is used to detect isolated dots accompanied with an input character image when a special-kind character image is derived from the input character image and to remove the isolated dots from such an image. This function of the above publication may be considered an isolated-dot removing function. By using such a function, the image processing device of the above publication can provide an increased level of image quality of a reproduced image which is not influenced by noises in the input character image.

However, there are a variety of isolated dots which may be included in a character image, the isolated dots being different from each other in size and configuration. In the above image processing device, the isolated-dot removing function does not provide an appropriate background correction to remove the isolated dots when a character image different from the above-mentioned special-kind character image is read out. The isolated-dot removing function of the above image processing device is limited to a case in which the above-mentioned special-kind character image is read out. The size and configuration of the special-kind character image are predetermined and cannot be changed. When a character image having a different size or a different configuration is read out, the above image processing device cannot select a desired level of the isolated-dot removing function to be performed for processing such a image.

Also, the isolated-dot removing function of the above image processing device always serves to remove the isolated dots even when the isolated dots must be attached to a character image and they should not be removed. It is impossible for the above image processing device to set an OFF state of the isolated-dot removing function in a case in which the performance of the isolated-dot removing function is not desired.

SUMMARY OF THE INVENTION

An object of the present invention is to provide an improved image processing apparatus in which the above-described problems are eliminated.

Another object of the present invention is to provide an image processing apparatus which effectively performs an isolated-dot removing function with a desired function level so that a reproduced image having an increased level of image quality and containing no isolated dots can be produced.

The above-mentioned objects of the present invention are achieved by an image processing apparatus which comprises: a plurality of detecting units each of which detects whether binary signals derived from picture elements of the image data match with one of a plurality of patterns of isolated dots, the plurality of detecting units generating a plurality of detection signals which are set based on respective results of the detections with respect to the isolated-dot patterns, wherein the isolated-dot patterns are different from each other in the number of isolated dots included in each pattern, the isolated-dot patterns having respective sizes which are predetermined for isolated-dot removing function levels; a selecting unit, coupled to the plurality of detecting units, for selecting one of the isolated-dot removing function levels in response to an operation control signal, the selecting unit generating an isolated-dot signal which is set for each picture element based on the detection signals by the selected isolated-dot removing function level; and an operation control unit for inputting the operation control signal to the selecting unit in accordance with a setting by an operator with respect to one of the isolated-dot removing function levels.

The image processing apparatus of the present invention allows the operator to select a desired one of the plurality of isolated-dot removing function levels in accordance with the isolated-dot size, the isolated-dot feature or the document type. Further, the present invention allows the operator to select an OFF state of the isolated-dot removing function in a case in which the performance of the isolated-dot removing function is not desired. Therefore, the present invention provides a flexibility of the isolated-dot removing function level for the operator in order to attain an increased level of image quality of a reproduced image for various isolated-dot sizes, various isolated-dot features or various document types.

BRIEF DESCRIPTION OF THE DRAWINGS

The above and other objects, features and advantages of the present invention will become more apparent from the following detailed description when read in conjunction with the accompanying drawings in which.

DETAILED DESCRIPTION OF THE PREFERRED EMBODIMENTS

A description will now be given of the preferred embodiments of the present invention with reference to the accompanying drawings.

Figure 1:
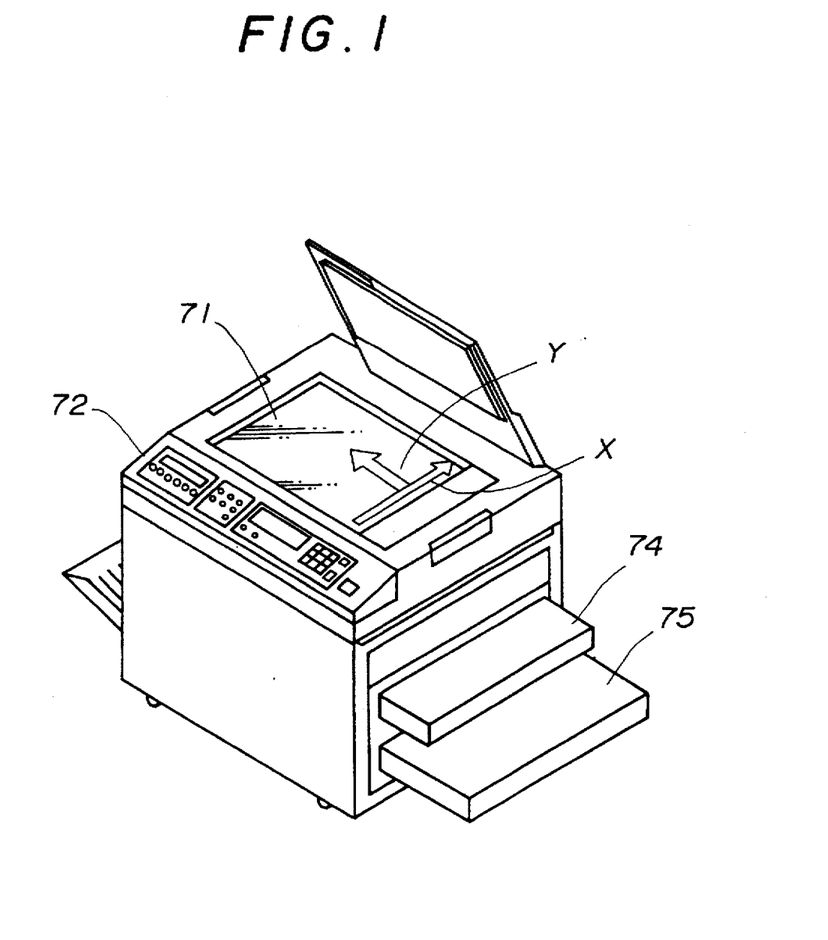
FIG. 1 is a perspective view of a digital copying machine to which one embodiment of the present invention is applied.

FIG. 1 shows a digital copying machine to which one embodiment of the present invention is applied.

As shown in FIG. 1, the digital copying machine includes a document base 71 and a control board 72. When printing a reproduced image on a copy sheet, a document with its original image is placed on the document base 71. The document base 71 is, for example, a transparent glass plate. In the digital copying machine, sheet cassettes 74 and 75 for containing copy sheets of different sizes are provided to supply one of the copy sheets to a printing portion at which the printing of the reproduced image on the copy sheet is performed.

An image reading part and an image writing part are provided within the digital copying machine, and these parts will be described later. In the digital copying machine, the original image of the document is optically read by the image reading part through the document base 71. Various image processing procedures for the read image are performed by the digital copying machine. An image processing procedure according to the present invention is one of those procedures, and this procedure is performed by the digital copying machine. After all the image processing procedures are performed, the processed image is recorded on a photosensitive medium (not shown) by the image writing part, so that the reproduced image is transferred to a copy sheet from a paper cassette.

The original image is optically read by a CCD (charge-coupled device) line sensor in a main scanning direction indicated by an arrow "X" in FIG. 1. The reading of the original image in a sub-scanning direction indicated by an arrow "Y" in FIG. 1, is performed by moving the CCD line sensor relative to the position of the original image.

When image data is read out from the original image, the image data is divided into a plurality of dots (or picture elements). In the above digital copying machine, both the resolution with respect to the main scanning direction "X" and the resolution with respect to the sub-scanning direction "Y" are 400 dpi (dots per inch).

The control board 72 includes a plurality of operational keys and switches for inputting selected operational conditions and selected functional modes. The control board 72 further includes a plurality of operational indicators and/or other items for inputting a command to set the digital copying machine in a selected operational item.

Figure 2:
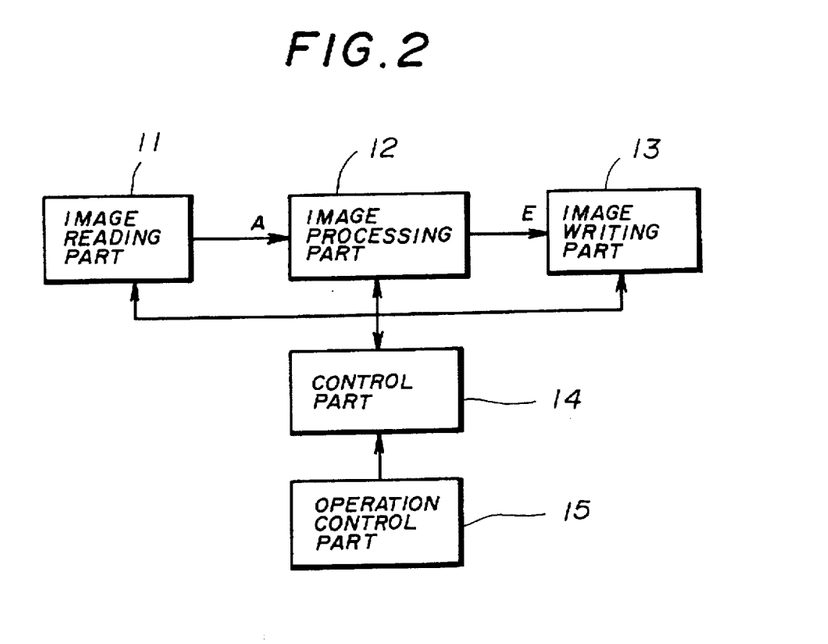
FIG. 2 is a block diagram of an image processing apparatus in one embodiment of the present invention.

FIG. 2 shows an image processing apparatus in one embodiment of the present invention, which is applied to the digital copying machine in FIG. 1.

Referring to FIG. 2, the image processing apparatus is essentially made up of an image reading part 11, an image processing part 12, an image writing part 13, a control part 14, and an operation control part 15.

The image reading part 11 includes the CCD line sensor which outputs an analog image signal by optically reading an original image. The image reading part 11 performs amplifying, analog-to-digital converting, and shading correction procedures for the analog image signal output from the CCD line sensor.

The image processing part 12 performs filtering, isolated-dot removing, size changing and gradation processing procedures for a digital image signal "A" from the image reading part 11. Among these procedures, the isolated-dot removing procedure is related to the image processing apparatus of the present invention. The image processing part 12 outputs a digital image signal "E" to the image writing part 13.

The image writing part 13 performs various image printing procedures by using a conventional laser-beam printer in accordance with the digital image signal E from the image processing part 12. The image printing procedures include laser beam modulation, photosensitive medium recording, developing, transferring and fixing procedures.

The operation control part 15 inputs various operating conditions including a gradation processing mode, a recorded-image density, a size-change ratio factor, and an isolated-dot removing function level. These operating conditions are arbitrarily determined by an operator on the digital copying machine in order to input them to the image processing part 12 via the control part 14.

The control part 14 outputs a control signal to control the image reading part 11, the image processing part 12 and the image writing part 13, in accordance with each of the operating conditions from the operation control part 15.

Figure 3:
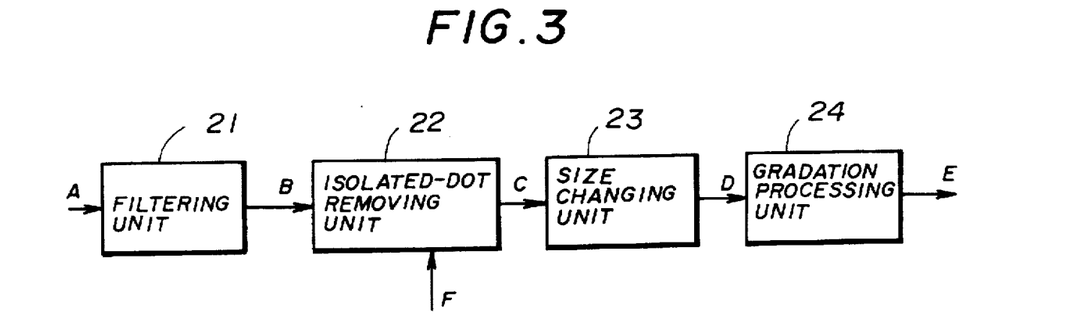
FIG. 3 is a block diagram of an image processing part of the image processing apparatus in FIG. 2.

FIG. 3 shows a construction of the image processing part 12 of the image processing apparatus in FIG. 2. Referring to FIG. 3, the image processing part 12 comprises a filtering unit 21, an isolated-dot removing unit 22, a size changing unit 23, and a gradation processing unit 24.

In FIG. 3, a digital image signal indicated an arrow "B" is output from the filtering unit 21 to the isolated-dot removing unit 22, a digital image signal indicated by an arrow "C" is output from the isolated-dot removing unit 22 to the size changing unit 23, and a digital image signal indicated by an arrow "D" is output from the size changing unit 23 to the gradation processing unit 24. A digital image signal "E" is output by the gradation processing unit 24, and this signal is the same as a corresponding signal in FIG. 2. A digital image signal "A" is input to the filtering unit 21, and this signal is the same as a corresponding signal supplied from the image reading part 11 to the image processing part 12 in FIG. 2. Each of the digital image signals A through E consists of 8 bits which represent 256 gradation levels.

In the above image processing part, an operation control signal which is indicated by an arrow "F" in FIG. 3 is supplied from the operation control part 15 to the isolated-dot removing unit 22 of the image processing part 12 via the control part 14. This signal F indicates an isolated-dot removing function ON/OFF state as well as a selected isolated-dot removing function level in accordance with the setting of the operator. The filtering unit 21, the size changing unit 23, and the gradation processing unit 24 are known in the art. These units can be constructed by using conventional component parts of the digital copying machine.

Figure 4:
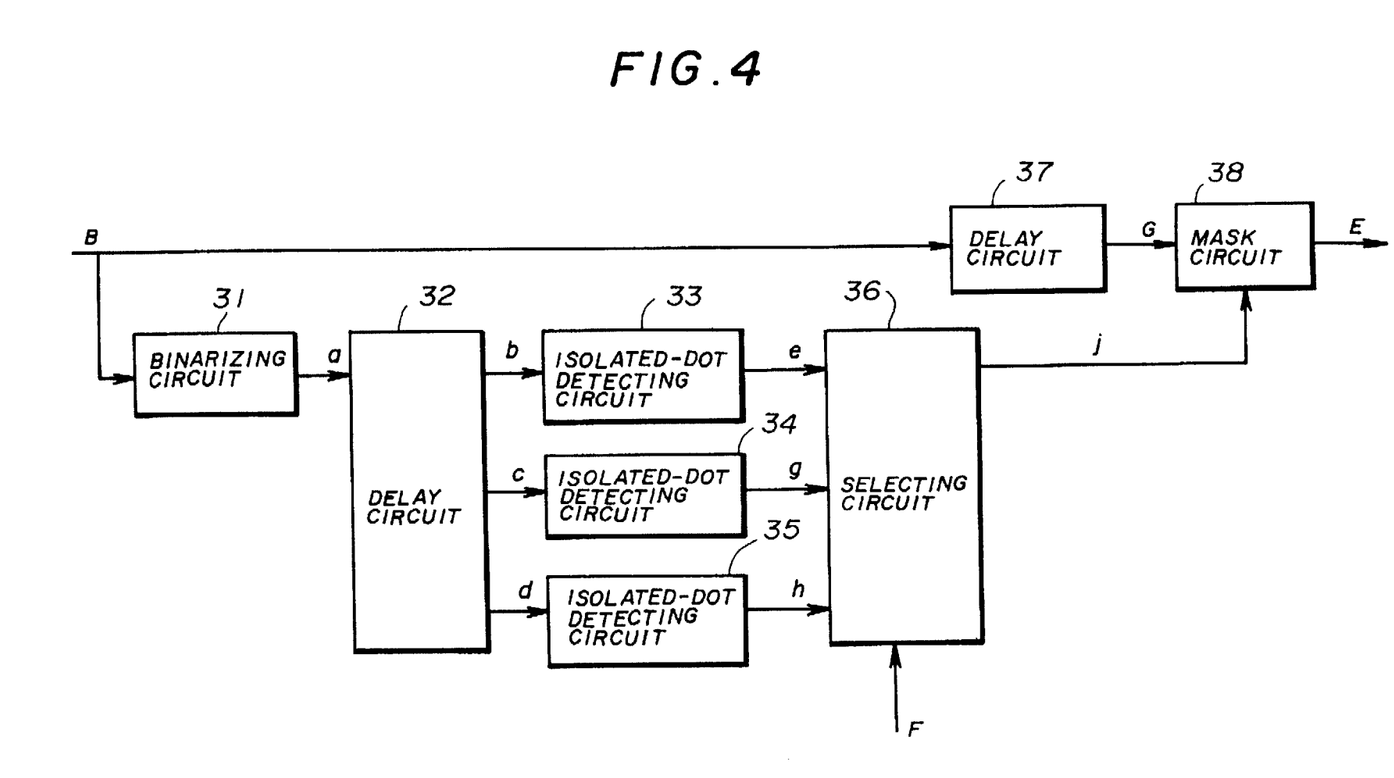
FIG. 4 is a block diagram of an isolated-dot removing unit of the image processing part in FIG. 3.

FIG. 4 shows a construction of the isolated-dot removing unit 22 in FIG. 3. Referring to FIG. 4, the isolated-dot removing unit comprises a binarizing circuit 31, a delay circuit 32, three isolated-dot detecting circuits 33, 34 and 35, a selecting circuit 36, a delay circuit 37, and a mask circuit 38.

The image signal B which is supplied from the filtering unit 21 consists of 8 bits representing 256 gradation levels, and is supplied to both the binarizing circuit 31 and the delay circuit 37. In response to the image signal B, the binarizing circuit 31 generates a binary signal "a" for each picture element by comparison of the image signal "B" with a predetermined slice level. The binary signal a at the output of the binarizing circuit 31 is set at either LOW state (zero) or HIGH state (one) in accordance with the image signal B. The binary signal a which is set at one "1" represents black, and the binary signal a which is set at zero "0" represents white.

The delay circuit 32 delays the binary signal a in the main scanning direction X as well as in the sub-scanning direction Y by a delay of time corresponding to a delay of time for a plurality of binary signals for a plurality of picture elements to pass through the delay circuit 32. As a result of respective delaying functions, the delay circuit 32 outputs a plurality of binary signals "b" to the isolated-dot detecting circuit 33 as the image data, outputs a plurality of binary signals "c" to the isolated-dot detecting circuit 34 as the image data, and outputs a plurality of binary signals "d" to the isolated-dot detecting circuit 35 as the image data.

The isolated-dot detecting circuits 33, 34 and 35 are used to detect a matching of the image data with three different patterns of isolated dots (black), each pattern having a predetermined size and a predetermined configuration. The respective sizes of the isolated-dot patterns are different from each other, and the respective configurations thereof are also different from each other.

When the matching of the binary signals b with a first pattern of isolated dots is detected by the isolated-dot detecting circuit 33, a binary signal "e" at the output of the isolated-dot detecting circuit 33 is set at zero (LOW state) which indicates a detection state relating to the first isolated-dot pattern. Otherwise, the binary signal e is set at one (HIGH state) which indicates a non-detection state relating to the first isolated-dot pattern. The binary signal e at the output of the isolated-dot detecting circuit 33 indicates a binary state (black or white) of a picture element at a position corresponding to one of the isolated dots in the first pattern (which picture element is called a subject picture element).

When the matching of the binary signals c with a second pattern of isolated dots is detected by the isolated-dot detecting circuit 34, a binary signal "g" at the output of the isolated-dot detecting circuit 34 is set at zero (detection state). Otherwise, the binary signal g is set at one (non-detection state). The binary signal g at the output of the isolated-dot detecting circuit 34 indicates a binary state (black or white) of the subject picture element in the second pattern.

When the matching of the binary signals d with a third pattern of isolated-dots is detected by the isolated-dot detecting circuit 35, a binary signal "h" at the output of the isolated-dot detecting circuit 35 is set at zero (detection state). Otherwise, the binary signal h is set at one (non-detection state). The binary signal h at the output of the isolated-dot detecting circuit 35 indicates a binary state (black or white) of the subject picture element in the third pattern.

The selecting circuit 36 selects one of an OFF state of the isolated-dot removing function and a plurality of isolated-dot removing function levels (each for an ON state of the isolated-dot removing function) in accordance with the operation control signal F supplied from the operation control part 15. When one of the isolated-dot removing function levels (the ON state of the isolated-dot removing function) is selected, the selecting circuit 36 generates an isolated-dot signal "j" based on the binary signals e, g and h from the isolated-dot detecting circuits 33, 34 and 35. The isolated-dot signal j at the output of the selecting circuit 36 is a binary signal which indicates a detection/non-detection state as the result of the isolated-dot detection. When a matching of the binary signals for the picture elements with at least one of the above-mentioned isolated-dot patterns is detected by the isolated-dot detecting circuits 33, 34 and 35, the isolated-dot signal j for the subject picture element, at the output of the selecting circuit 36, is set at zero (LOW state).

The delay circuit 37 delays the digital image signal B by a delay of time corresponding to a delay of time for supplying the isolated-dot signal j to the mask circuit 38 after the image signal B is input. As a result of a delaying function, the delay circuit 38 outputs a digital image signal G for each picture element. Similarly to the image signal B, the image signal G consists of 8 bits representing 256 gradation levels.

The mask circuit 38 converts the digital image signal G for each picture element into the digital image signal E in accordance with the value of the isolated-dot signal j from the selecting circuit 36. The image signal E indicates a white dot, regardless of whether the image signal G for the picture element is black or white, when the isolated-dot signal j is set at zero. In other words, when an isolated dot (black) in the original image is detected, the image signal E at the output of the mask circuit 38 for the picture element of the isolated dot is set at zero (white dot). Otherwise the image signal E indicates a black or white dot in accordance with the value of the image signal G. Accordingly, the isolated dots are removed if they are detected in the original image.

Concerning each of the binarizing circuit 31, the delay circuits 32 and 37, and the mask circuit 38 used in the present invention, see Japanese Laid-Open Patent Application No. 62-104372. This publication teaches a binarizing circuit, a delay circuit, a text-area detecting circuit, and a photographic-area detecting circuit as a background technology of the image processing apparatus of the present invention.

Figure 5:
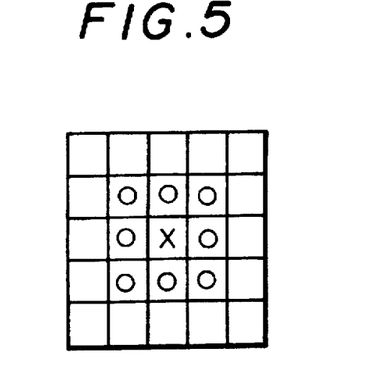
FIGS. 5 through 7 are diagrams for explaining isolated-dot patterns which are used by the isolated-dot removing unit in FIG. 4 to detect the presence of isolated dots in the read-out image data.
Figure 6:
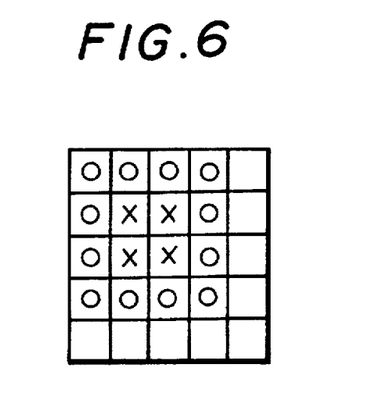
Figure 7:
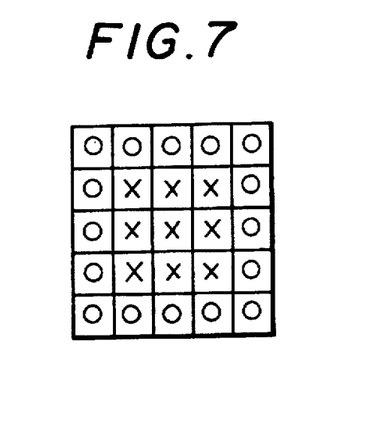

FIGS. 5 through 7 are diagrams for explaining respective operations of the isolated-dot detecting circuits 33, 34 and 35 in FIG. 4.

FIG. 5 shows a first pattern of 5×5 picture elements on which an isolated-dot detecting operation of the isolated-dot detecting circuit 33 is based.

The plurality of binary signals "b" which indicate respective black/white states of the 5×5 picture elements are supplied from the delay circuit 32 to the isolated-dot detecting circuit 33 as shown in FIG. 4.

In FIG. 5, "O" indicates a position of a white dot in the first pattern, and "X" indicates a position of a "don't care" dot in the first pattern. In the first pattern, consideration is not taken for the positions of the other dots with neither "O" label nor "X".

When all the binary signals b for the picture elements at the positions "O" in the first pattern are detected as zeros (white), the picture element at the position "X" in the first pattern is determined as the isolated dot, regardless of whether the binary signal b for the picture element at the position "X" is one or zero. The binary signal e for the picture element at the position "X", at the output of the isolated-dot detecting circuit 33, is set at zero (the detection state). Otherwise the binary signal e for the picture element at the position "X" is set at one (the non-detection state).

FIG. 6 shows a second pattern of 5×5 picture elements on which an isolated-dot detecting operation of the isolated-dot detecting circuit 34 is based.

Similarly to FIG. 5, "O" indicates a position of a white dot in the second pattern in FIG. 6, and "X" indicates a position of a "don't care" dot in the second pattern. The plurality of binary signals "c" which indicate respective black/white states of the 5×5 picture elements are supplied from the delay circuit 32 to the isolated-dot detecting circuit 34 as shown in FIG. 4.

When all the binary signals c for the picture elements at the positions "O" in the second pattern are detected as zeros (white), the picture elements at the positions "X" in the second pattern are determined as the isolated dots, regardless of whether the binary signals c for the picture elements at the positions "X" are ones or zeros. The binary signal g, for each of the picture elements at the positions "X" in the second pattern, at the output of the isolated-dot detecting circuit 34, is set at zero (the detection state). Otherwise the binary signal g for each of the picture elements at the positions "X" in the second pattern is set at one (the non-detection state).

FIG. 7 shows a third pattern of 5×5 picture elements on which an isolated-dot detecting operation of the isolated-dot detecting circuit 35 is based.

Similarly to FIG. 5, "O" indicates a position of a white dot in the third pattern in FIG. 7, and "X" indicates a position of a "don't care" dot in the third pattern. The plurality of binary signals "d" which indicate respective black/white states of the 5×5 picture elements are supplied from the delay circuit 32 to the isolated-dot detecting circuit 35 as shown in FIG. 4.

When all the binary signals d for the picture elements at the positions "O" in the third pattern are detected as zeros (white), the picture elements at the positions "X" in the third pattern are determined as the isolated dots, regardless of whether the binary signals d for the picture elements at the positions "X" are ones or zeros. The binary signal h for each of the picture elements at the positions "X" in the third pattern, at the output of the isolated-dot detecting circuit 35, is set at zero (the detection state). Otherwise the binary signal h for each of the picture elements at the positions "X" in the third pattern is set at one (the non-detection state).

In the present embodiment, the first, the second, and the third isolated-dot patterns shown in FIG. 5, FIG. 6 and FIG. 7 are stored in a memory (not shown in FIG. 4) of the image processing apparatus.

Accordingly, in the present embodiment, the isolated-dot detecting circuit 33 detects the isolated dot (the first pattern) having a size equal to the size of one dot, the isolated-dot detecting circuit 34 detects the second pattern of isolated dots having a size equal to or smaller than the size of 2×2 picture elements, and the isolated-dot detecting circuit 35 detects the third pattern of isolated dots having a size equal to or smaller than the size of 3×3 picture elements.

Figure 8:
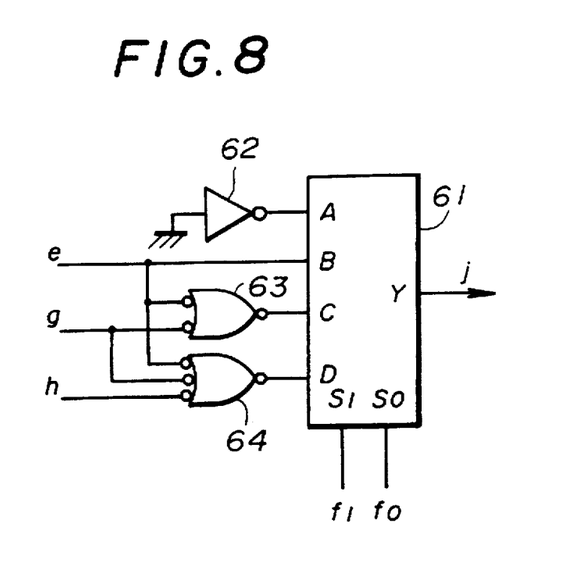
FIG. 8 is a block diagram of a selecting circuit of the isolated-dot removing unit in FIG. 4.

FIG. 8 shows a construction of the selecting circuit 36 in FIG. 4. Referring to FIG. 8, the selecting circuit comprises a selector 61, a first logic gate 62, a second logic gate 63, and a third logic gate 64. The selector 61 has input terminals "A", "B", "C" and "D", input terminals "s0" and "s1", and an output terminal "Y".

As shown in FIG. 8, binary signals "e", "g" and "h" from the isolated-dot detecting circuits 33, 34 and 35 are supplied to the selecting circuit 36 as the inputs, and a binary signal "j" is generated at the output of the selecting circuit 36. The signals "e", "g", "h", and "j" are the same as corresponding signals shown in FIG. 4. A binary signal "f0" and a binary signal "f1", which are respectively input to the terminal s0 and the terminal s1 of the selector 61, constitute the operation control signal F sent by the operation control part 15 to the selecting circuit 36. In other words, the operation control signal F is a 2-bit digital signal consisting of the binary signals f0 and f1.

In FIG. 8, a binary signal "A" is generated at the output of the first logic gate 62 and supplied to the input terminal A of the selector 61, and this signal A is set at one (HIGH state). During an initial operating condition of the digital copying machine, the OFF state of the isolated-dot removing function is automatically set, and the binary signal f0 and the binary signal f1 are set at zeros. At this time, the binary signal A at the input A of the selector 61 is selected as the output signal j at the output Y of the selector 61.

Further, in FIG. 8, the binary signal e which is the same as the corresponding signal in FIG. 4 is supplied to the input terminal B of the selector 61. The binary signal e and the binary signal g are simultaneously input to the second logic gate 63, and a binary signal "C" is generated at the output of the second logic gate 63 in response to the input signals e and g, and the binary signal "C" is supplied to the input terminal C of the selector 61. Further, the binary signal e, the binary signal g and the binary signal h are simultaneously input to the third logic gate 64, and a binary signal "D" is generated at the output of the third logic gate 64 in response to the input signals e, g and h, and the binary signal "D" is supplied to the input terminal D of the selector 61.

The selector 61 selects one of the four binary signals A through D in accordance with the operation control signal F (=f0+f1) at the input terminals s0 and s1, and generates the selected binary signal "j" at the output terminal Y. The binary signal generated at the output terminal Y of the selector 61 is the same as the binary signal j shown in FIG. 4.

In order to explain the operation of the selector 61, the relationship between the operation control signal F (=f0+f1) at the input terminals s0 and s1 of the selector 61, the binary signal j at the output terminal Y of the selector 61, and the isolated-dot patterns used to accomplish the isolated-dot removing function is given below.

TABLE

| INPUT | | OUTPUT | |
|---|---|---|---|
| s1 (f1) | s0 (f0) | Y (j) | ISOLATED-DOT PATTERN |
| 0 | 0 | A | none |
| 0 | 1 | B | FIG. 5 |
| 1 | 0 | C | FIG. 5 & FIG. 6 |
| 1 | 1 | D | FIG. 5, FIG. 6, & FIG. 7 |

Figure 9:
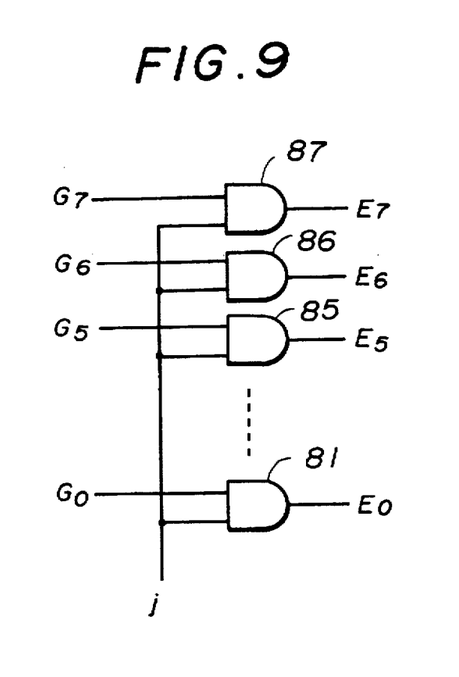
FIG. 9 is a block diagram of a mask circuit of the isolated-dot removing unit in FIG. 4.

FIG. 9 shows a construction of the mask circuit 38 in FIG. 4. Referring to FIG. 9, the mask circuit 38 comprises eight AND gates 81 through 87. Each of the AND gates 81 through 87 has two inputs and one output. Eight binary signals G0 through G7 at first inputs of the AND gates 81 through 87 constitute the 8-bit image signal G. This image signal G is the same as the corresponding image signal in FIG. 4 which is supplied from the delay circuit 37 to the mask circuit 38. The signal G0 indicates the least significant bit (LSB) of the image signal G, and the signal G7 indicates the most significant bit (MSB) of the image signal G.

The binary signal j which is supplied to each of second inputs of the AND gates 81 through 87 is the same as the corresponding signal in FIG. 8. This binary signal j is supplied from the selector 61 to the mask circuit 38. This binary signal j is called the isolated-dot signal.

Eight binary signals E0 through E7 at the outputs of the AND gates 81 through 87 constitute the 8-bit image signal E which is output by the mask circuit 38. The signal E0 indicates the least significant bit (LSB) of the image signal E, and the signal E7 indicates the most significant bit (MSB) of the image signal E.

In the above mask circuit 38, when the isolated-dot signal j is zero (LOW state), all the binary signals E0–E7 at the outputs of the AND gates 81–87 are set at zero (white), regardless of whether the binary signals G0–G7 are zeros or ones. Accordingly, when the isolated dot (black) is detected, the picture element at the position of the isolated dot is changed into a white dot. In other words, the isolated dot is removed from the reproduced image.

Figure 10:
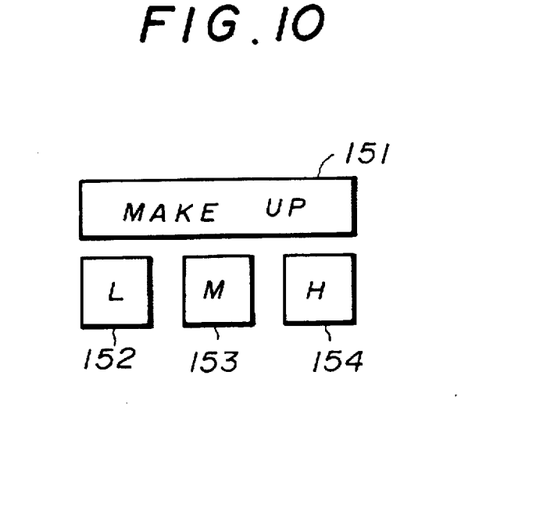
FIG. 10 is a diagram showing an operation control part of the image processing apparatus in FIG. 2.

FIG. 10 shows a portion of the operation control part 15 in FIG. 2. Only the portion of the operation control part 15 which is related to the image processing apparatus of the present embodiment is shown in FIG. 10. The operation control part 15 in the present embodiment is applied to the control board 82 of the digital copying machine in FIG. 1.

Referring to FIG. 10, an isolated-dot removing function indication 151 is labeled "MAKE UP". This label "MAKE UP" is attached in order to give an operator a special attention and familiarity to the isolated-dot removing function. Three isolated-dot removing level keys 152, 153 and 154 are labeled "L", "M" and "N", respectively. The isolated-dot removing level keys 152, 153 and 154 respectively have light-emitting devices beneath the tops of the keys.

The label "L" of the key 152 indicates a low level of the isolated-dot removing function. When the low level "L" is set by the operator, only the isolated-dot pattern in FIG. 5 is used to accomplish the isolated-dot removing function. The label "M" of the key 153 indicates a middle level of the isolated-dot removing function. When the middle level "M" is set by the operator, the isolated-dot patterns in FIGS. 5 and 6 are used to accomplish the isolated-dot removing function. The label "H" of the key 154 indicates a high level of the isolated-dot removing function. When the high level "H" is set by the operator, the isolated-dot patterns in FIGS. 5, 6 and 7 are used to accomplish the isolated-dot removing function.

When one of the isolated-dot removing level keys 152, 153 and 154 is turned ON, the light-emitting device of the corresponding key lights up. This indicates which one of the isolated-dot removing function levels of the image processing apparatus is selected. When the isolated-dot removing level key (152, 153 or 154) which is lighting up is turned OFF, the selected isolated-dot removing function level is canceled and the light of the key is turned OFF.

For example, when the key 152 with the low-level label "L" is turned ON, the operation control signal F (=f0+f1) from the operation control part 15 is set at "01" (f0=1, f1=0). As described above, the selector 61 selects the binary signal B among the input binary signals A–D in accordance with the operation control signal F, and generates the selected binary signal B at the output terminal Y. Therefore, the isolated-dot pattern in FIG. 5 is used to accomplish the isolated-dot removing function.

When the digital copying machine is operated in an initial operating condition, none of the isolated-dot removing level keys 152, 153 and 154 are ON, and none of the light-emitting devices thereof light up. Thus, during the initial operating condition of the digital copying machine, the OFF state of the isolated-dot removing function is set in accordance with the operation control signal F (=f0+f1) which is set at "00" (f0=0, f1=0).

Generally, there are a variety of types of documents containing isolated dots, whose copy is reproduced by the digital copying machine. The types of documents include printed matter, hand-written documents, drawings, and photographs. In addition, isolated dots included in the original image have different sizes or different forms depending on the document type, and the number of isolated dots included in the original image varies depending on the document type.

In the above-described embodiment, the operator is allowed to select a desired one of a plurality of isolated-dot removing function levels depending on the isolated-dot size, the isolated-dot feature or the document type. Further, in the above-described embodiment, the OFF state of the isolated-dot removing function can be set by the operator in a case in which the performance of the isolated-dot removing function is not desired. Therefore, it is possible for the present embodiment to provide a flexibility of the isolated-dot removing function level for the operator in order to attain an increased level of image quality of a reproduced image for various isolated-dot sizes, various isolated-dot features or various document types.

Figure 11:
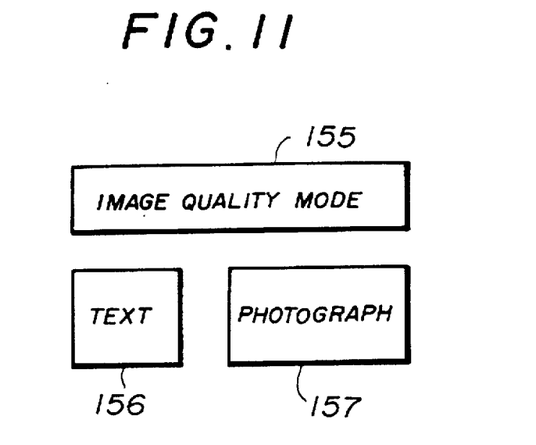
FIG. 11 is a diagram showing an image-quality-mode portion of an operation control part in another embodiment of the present invention.

Next, FIG. 11 shows an image-quality-mode portion of an operation control part 15 in another embodiment of the present invention.

The operation control part 15 in the embodiment in FIG. 11 is applied to the control board 82 of the digital copying machine in FIG. 1. Only the image-quality-mode portion of the operation control part 15 which is related to the image processing apparatus of the present embodiment is shown in FIG. 11.

Referring to FIG. 11, an image-quality-mode indication 155 is labeled "IMAGE QUALITY MODE". This label is attached in order to give an operator a special attention to the image quality mode setting. Two image-quality-mode keys 156 and 157 are labeled "TEXT" and "PHOTOGRAPH". The image-quality-mode keys 156 and 157 have light-emitting devices beneath the tops of the keys.

The label "TEXT" of the key 156 indicates a setting of a text-mode gradation processing suited to text images for the image processing apparatus. When the "TEXT" key 156 is turned ON, the text-mode gradation processing suited to text images is performed by the gradation processing unit 24.

The label "PHOTOGRAPH" of the key 157 indicates a setting of a photographic-mode gradation processing suited to photographic images for the image processing apparatus. When the "PHOTOGRAPH" key 157 is turned ON, the photographic-mode gradation processing suited to photographic images is performed by the gradation processing unit 24.

Figure 12:
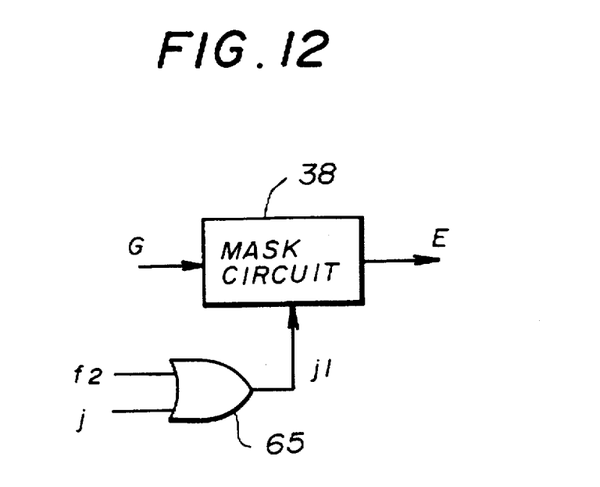
FIG. 12 is a block diagram of a mask circuit of an isolated-dot removing unit in the embodiment in FIG. 11.

FIG. 12 shows a mask circuit 38 of an isolated-dot removing unit in the embodiment in FIG. 11. The mask circuit 38 in the embodiment in FIG. 12 is applied to the isolated-dot removing unit in FIG. 4. In FIG. 12, unless otherwise specified, the elements which are the same as corresponding elements in FIG. 4 are designated by the same reference numerals, and a description thereof will be omitted.

Referring to FIG. 12, a logic gate 65 is connected to an input of the mask circuit 38. The mask circuit 38 has inputs connected to the delay circuit 37 and the logic gate 65, and an output connected to the image writing part 13.

As shown in FIG. 12, a binary signal "f2" from the operation control part 15 and the isolated-dot signal "j" from the selecting circuit 36 are simultaneously supplied to the logic gate 65 as the input signals, and a binary signal "j1" is generated at the output of the logic gate 65 in response to the input signals f2 and j, and the binary signal "j1" is supplied to the input of the mask circuit 38. A construction of the mask circuit 38 in FIG. 12 is the same as that of the mask circuit in FIG. 9, but the binary signal j1 in FIG. 12 is supplied to the mask circuit 38, instead of the binary signal j supplied to the mask circuit in FIG. 9.

The operation control part 15 generates the binary signal f2 in response to with the setting of the image quality mode by the operator with respect to one of the text-mode key 156 and the photographic-mode key 157, and supplies the same to the isolated-dot removing unit 22 of the image processing part 12. When the text-mode key 156 is turned ON, the binary signal f2 is set at zero (LOW state). When the photographic-mode key 157 is turned ON, the binary signal f2 is set at one (HIGH state).

When the binary signal f2 is set at zero (the text mode), the binary signal j1 is set at one or zero in accordance with the value of the isolated-dot signal j for each picture element ("j1"="j"). On the other hand, when the binary signal f2 is set at one (the photographic mode), the binary signal j1 is set at one (HIGH state) regardless of whether the isolated-dot signal j for each picture element is set at one or zero.

Since the binary signal j1 in FIG. 12 is supplied to the mask circuit 38 instead of the binary signal j supplied to the mask circuit in FIG. 9, the ON state of the isolated-dot removing function is set by the image processing apparatus of the present embodiment only when the text-mode key 156 is turned ON, one of the isolated-dot removing level keys 152, 153 and 154 is turned ON, and the isolated-dot signal j1 is set at zero. Otherwise the OFF state of the isolated-dot removing function is set in the present embodiment.

Figure 13:
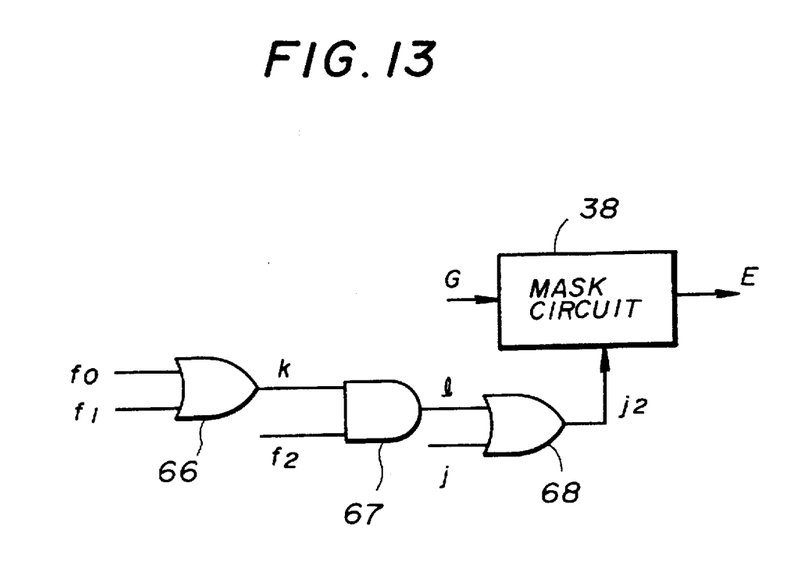
FIG. 13 is a block diagram of a mask circuit of another isolated-dot removing unit in the embodiment in FIG. 11.

FIG. 13 shows another mask circuit of an isolated-dot removing unit in the embodiment of the present invention. Similarly to the embodiment in FIG. 12, the mask circuit 38 in the embodiment in FIG. 13 is applied to the isolated-dot removing unit in FIG. 4. In FIG. 13, unless otherwise specified, the elements which are the same as corresponding elements in FIG. 4 are designated by the same reference numerals, and a description thereof will be omitted.

Referring to FIG. 13, a first logic gate 66, a second logic gate 67, and a third logic gate 68 are connected in series, and the logic gate 68 is connected to an input of the mask circuit 38. The mask circuit 38 has inputs connected to the delay circuit 37 and the logic gate 68, and has an output connected to the image writing part 13.

As shown in FIG. 13, the binary signals "f0" and "f1" from the operation control part 15 are supplied to the first logic gate 66 as the input signals, and a binary signal "k" is generated at the output of the first logic gate 66 in response to the input signals f0 and f1. The binary signal "k" from the first logic gate 66 and the binary signal "f2"(which is the same as shown in FIG. 12) from the operation control part 15 are simultaneously supplied to the second logic gate 67 as the input signals, and a binary signal "1" is generated at the output of the second logic gate 67 in response to the input signals k and f2. The binary signal "1" from the second logic gate 67 and the isolated-dot signal "j" from the selecting circuit 36 are simultaneously supplied to the third logic gate 68 as the input signals, and a binary signal "j2" is generated at the output of the third logic gate 68 in response to the input signals 1 and j, and the binary signal "j1" is supplied to the input of the mask circuit 38. A construction of the mask circuit 38 in FIG. 13 is the same as that of the mask circuit in FIG. 9, but the binary signal j2 in FIG. 13 is supplied to the mask circuit 38, instead of the binary signal j supplied to the mask circuit in FIG. 9.

When one of the isolated-dot removing level keys 152, 153 and 154 is turned ON, at least one of the binary signals f0 and f1 is set at one (HIGH state), as shown in the above TABLE. In this case, the binary signal k is always set at one (HIGH state). When the binary signal k is set at one, the value of the binary signal 1 at the output of the second logic gate 67 is equal to the value of the binary signal f2 from the operation control part 15 ("1"="f2"). Therefore, when the text-mode key 156 is turned ON (the binary signal f2 is set at zero), the binary signal 1 is set at zero (LOW state), and when the photographic-mode key 157 is turned ON (the binary signal f2 is set at one), the binary signal 1 is set at one (HIGH state).

When the binary signal 1 is set at zero (the text mode), the value of the binary signal j2 at the output of the third logic gate 68 is equal to the value of the isolated-dot signal j from the selecting circuit 36 ("j2"="j"). In this case, the binary signal j2 is set at one or zero in accordance with the value of the isolated-dot signal j for each picture element, and the ON state of the isolated-dot removing function is set.

When the binary signal 1 is set at one (the photographic mode), the binary signal j2 is set at one (HIGH state) regardless of whether the isolated-dot signal j for each picture element is set at one or zero. In this case, the OFF state of the isolated-dot removing function is set.

When none of the isolated-dot removing level keys 152, 153 and 154 are turned ON, both the binary signals f0 and f1 are set at zero (LOW state) as shown in the above TABLE. The binary signal k at the output of the first logic gate 66 is set at zero (LOW state). The binary signal 1 at the output of the second logic gate 67 is set at zero (LOW state) regardless of whether the binary signal f2 is set at one or zero. Since the binary signal 1 is set at zero (LOW state), the value of the binary signal j2 may be set at one or zero in accordance with the value of the isolated-dot signal j from the selecting circuit 36 ("j2"="j"). Since the binary signals f0 and f1 are set at zero (LOW state), the binary signal j at the output of the selector 61 in FIG. 8 is set at one (HIGH state). Therefore, the binary signal j2 is always set at one (HIGH state), and the OFF state of the isolated-dot removing function is set.

Accordingly, it is possible for the image processing apparatus of the present embodiment to set the ON state of the isolated-dot removing function when the text mode is selected by the operator, and set the OFF state of the isolated-dot removing function when the photographic mode is selected by the operator. Further, in the present embodiment, the setting of the isolated-dot removing level keys 152, 153 and 154 is preferential to the setting of the image-quality-mode keys 156 and 157 when setting the ON state of the isolated-dot removing function.

Figure 14:
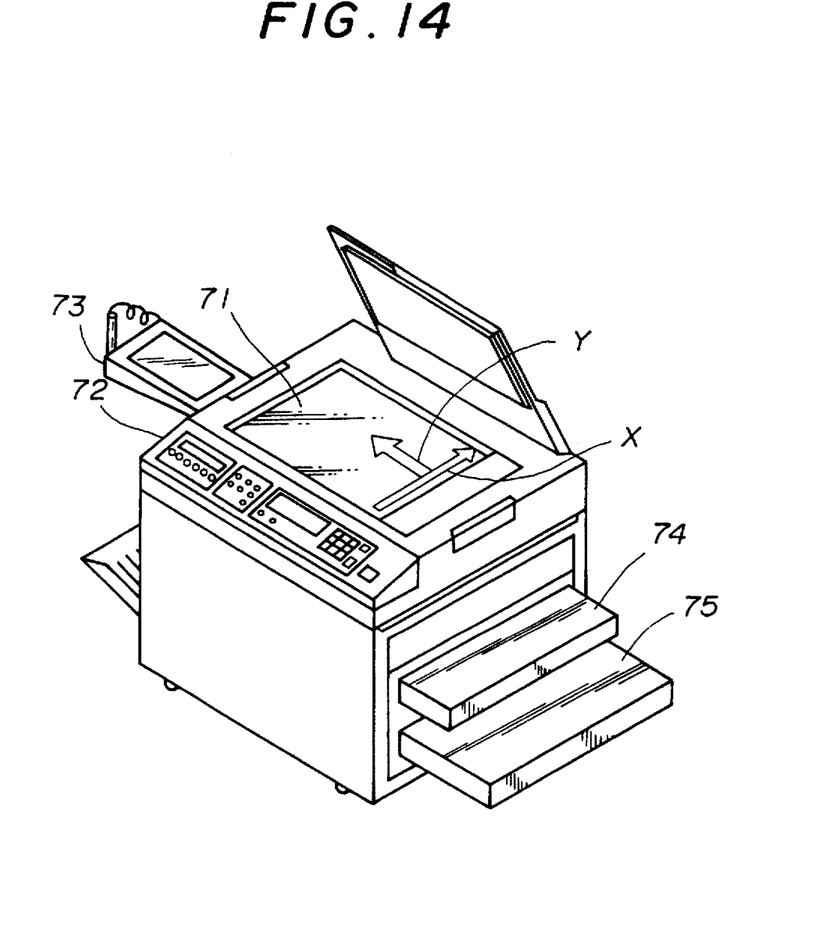
FIG. 14 is a perspective view of another digital copying machine to which a further embodiment of the present invention is applied.
Figure 15:
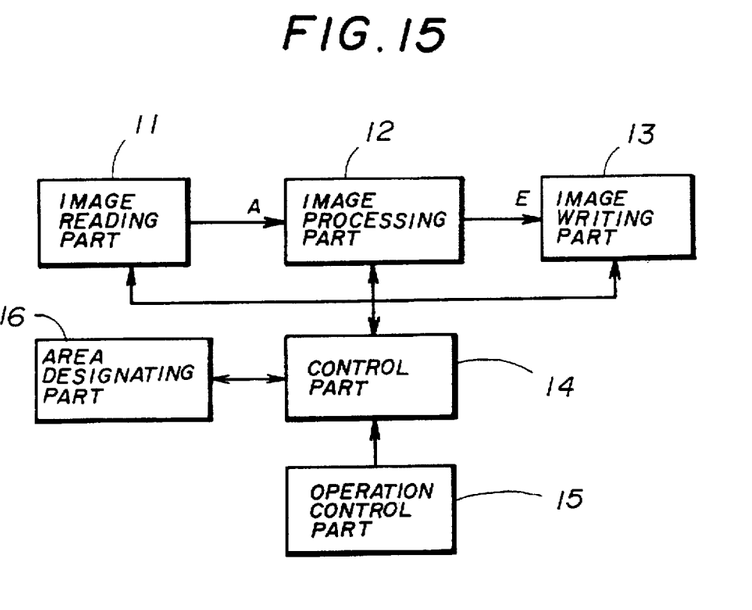
FIG. 15 is a block diagram of an image processing apparatus in the embodiment of the present invention.
Figure 16:
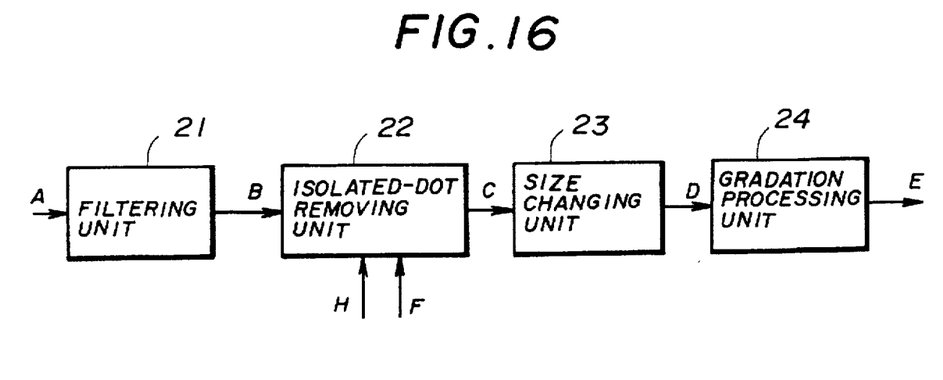
FIG. 16 is a block diagram of an image processing part of the image processing apparatus in FIG. 15.

Next, FIG. 14 shows another digital copying machine to which a further embodiment of the present invention is applied. FIG. 15 shows an image processing apparatus in the embodiment in FIG. 14. FIG. 16 shows an image processing part of the image processing apparatus in FIG. 15. In FIGS. 14, 15 and 16, the elements which are the same as corresponding elements in FIGS. 1, 2 and 3 are designated by the same reference numerals, respectively, and a description thereof will be omitted.

As shown in FIG. 14, the digital copying machine includes a digitizer 73 which is separately provided in addition to the control board 72. The digitizer 73 allows the operator on the digital copying machine to designate each of a plurality of areas in an original image as a first area (for example, a predetermined first color being assigned) or a second area (for example, a predetermined second color being assigned). The designation of the first area or the second area for each of the areas in the original image is arbitrarily determined by the operator on the digital copying machine in view of the original image.

As shown in FIG. 15, the image processing apparatus includes an area designating part 16. The area designating part 16 generates an area designation signal (which is indicated by an arrow "H" in FIG. 16) in response to the setting of the area designation by the operator, and supplies the same to the isolated-dot removing unit 22 of the image processing part 12 via the control part 14. When the first area is designated, the area designation signal "H" is set at zero (LOW state). When the second area is designated, the area designation signal "H" is set at one (HIGH state).

As shown in FIG. 16, the operation control signal "F" is supplied from the operation control part 15 to the isolated-dot removing unit 22 of the image processing part 12 via the control part 14. Also, the area designation signal "H" is supplied from the area designating part 16 to the isolated-dot removing unit 22 of the image processing part 12 via the control part 14.

Similarly to the binary signal f2 in the embodiments in FIG. 12 and FIG. 13, the area designation signal H from the area designating part 16 is supplied to a mask circuit 38 in the present embodiment. When the area designation signal H is set at zero (the first area is designated), a binary signal at the input of the mask circuit 38 is set at one or zero in accordance with the value of the isolated-dot signal j for each picture element, and the ON state of the isolated-dot removing function is set. When the area designation signal H is set at one (the second area is designated), the binary signal at the input of the mask circuit 38 is set at one (HIGH state) regardless of whether the isolated-dot signal j for each picture element is set at one or zero, and the OFF state of the isolated-dot removing function is set.

Accordingly, in the present embodiment, it is possible to set the ON state of the isolated-dot removing function when the first area is designated for the original image by the operator, and set the OFF state of the isolated-dot removing function when the second area is designated for the original image by the operator.

Further, the present invention is not limited to the above-described embodiments, and variations and modifications may be made without departing from the scope of the present invention. For example, the construction of the isolated-dot removing unit is not limited to that shown in FIG. 4 and may be modified in any suitable manner. The isolated-dot patterns and the isolated-dot removing function levels are not limited to those shown in FIGS. 5 through 7 and may be modified in any suitable manner. The construction and arrangement of the keys of the operation control part 15 are not limited to those in the above-described embodiments and may be modified in any suitable manner.

What is claimed is:

1. An image processing apparatus for providing an isolated-dot removing function when processing digital image data read from an original image, comprising:

a plurality of detecting means each of which detects whether binary signals derived from picture elements of the image data match with one of a plurality of patterns of isolated dots, said plurality of detecting means generating a plurality of detection signals which are set based on respective results of said detections with respect to the isolated-dot patterns, wherein the isolated-dot patterns are different from each other in the number of isolated dots included in each pattern, the isolated-dot patterns having respective sizes which are predetermined for isolated-dot removing function levels;

selecting means, coupled to said plurality of detecting means, for selecting one of the isolated-dot removing function levels in response to an operation control signal, said selecting means generating an isolated-dot signal which is set for each picture element based on the detection signals by the selected isolated-dot removing function level; and operation control means for inputting the operation control signal to said selecting means in accordance with a setting by an operator with respect to one of the isolated-dot removing function levels.

2. The image processing apparatus according to claim 1, wherein each of said plurality of detecting means detects the matching of the binary signals with one of the isolated-dot patterns when binary signals for the isolated dots of said one of the isolated-dot patterns are set in a predetermined color.

3. The image processing apparatus according to claim 1, wherein the plurality of the isolated-dot patterns for the plurality of detecting means are stored in a memory of the image processing apparatus.

4. The image processing apparatus according to claim 1, wherein said operation control means includes a plurality of keys included in a control board.

5. The image processing apparatus according to claim 1, wherein an OFF state of the isolated-dot removing function is set during an initial operating condition of the image processing apparatus.

6. The image processing apparatus according to claim 1, wherein said operation control means includes a plurality of isolated-dot removing level keys corresponding to the isolated-dot removing function levels, allowing the operator to set one of the plurality of isolated-dot removing level keys in order to input the operation control signal for a selected one of the isolated-dot removing function levels to the selecting means.

7. The image processing apparatus according to claim 1, wherein an OFF state of the isolated-dot removing function is set in accordance with the operation control signal from the operation control means when none of the isolated-dot removing function levels are selected.

8. The image processing apparatus according to claim 1, further comprising:

converting means for converting an image signal for each picture element into a corrected image signal in response to the isolated-dot signal from said selecting means so that the corrected image signal indicates a white dot when the isolated-dot signal indicates the presence of an isolated dot in the image data.

9. The image processing apparatus according to claim 8, further comprising:

area designating means for inputting an area designation signal to said converting means in accordance with a setting by an operator with respect to one of a plurality of area designations for the original image.

10. The image processing apparatus according to claim 1, wherein said operation control means includes a plurality of image quality mode keys corresponding to image quality modes, allowing the operator to set one of the plurality of image quality mode keys in order to input the operation control signal for a selected one of the image quality modes.

11. The image processing apparatus according to claim 1, wherein said operation control means includes a plurality of isolated-dot removing level keys corresponding to the isolated-dot removing function levels and a plurality of image quality mode keys corresponding to image quality modes, and wherein a setting of one of the plurality of isolated-dot removing level keys is preferential to a setting of one of the plurality of image quality mode keys when setting an ON state of the isolated-dot removing function.

* * * * *